Oct. 29, 1929.  K. STEJSKAL  1,733,283

ELECTRIC STREET CAR MOTOR WITH OVERHEAD CONDUCTOR AND ROLLER GEAR

Filed Dec. 22, 1928

Patented Oct. 29, 1929

1,733,283

UNITED STATES PATENT OFFICE

KARL STEJSKAL, OF BRUNN, CZECHOSLOVAKIA

ELECTRIC STREET-CAR MOTOR WITH OVERHEAD CONDUCTOR AND ROLLER GEAR

Application filed December 22, 1928, Serial No. 327,878, and in Czechoslovakia June 23, 1926.

My invention relates to a combination in electric street-car motors with overhead conductor and roller gear.

It often occurs—in particular when the car is describing a curve—that the rollers slip from the trolley wire, and will then repeatedly strike against said wire and the bracket suspensions, thereby subjecting the trolley wire to an unfavorable stress. Most of the breaks in trolley wires are due to this cause. If the striking against the bracket suspensions becomes vehement, the conducting wire will often be entirely pulled down.

My combination is adapted to obviate these inconveniences by automatically pulling down the roller whenever it slips from the trolley wire, so that said roller will not be allowed to strike against either the trolley wire or bracket suspensions.

To this purpose, the cord attached to the roller or the rod bearing the roller is connected to a block which whenever the roller slips from the trolley wire, will strike against a locking device, said locking device releasing thereby a box or case which, by means of a spring located therein, will be carried downward, whereby the block as well as the roller will be pulled down.

Figure 1:
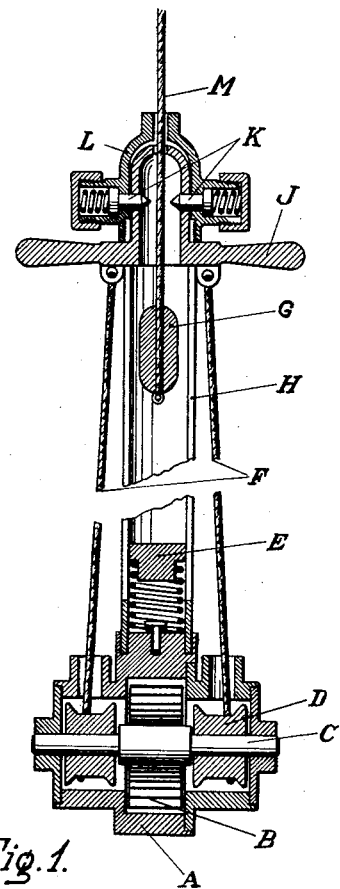
Figure 2:
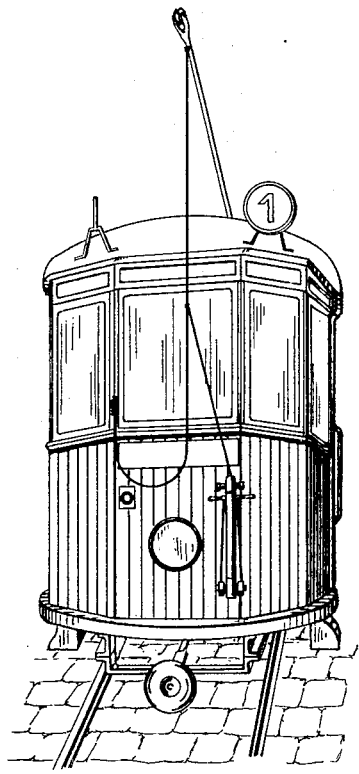

An embodiment of my invention is illustrated in the accompanying drawing in which Figure 1 shows a longitudinal section of the combination, and Figure 2 the combination applied to a street car motor. M is the cord dropping from the sliding contact. A branch of this cord is connected to the combination, and at its bottom end attached to the block G located in a casing H, which casing consists of a tube screwed at its bottom in the member A. The cap L is screwed onto the upper end of the tube H and the box J extends into the cap L which box is formed with two handles. Two ropes F are connected to the box J and the other ends of these ropes are attached to the pulleys D mounted pivotally on the axle C in the member A. When the combination is ready for use, a coil spring B the ends of which are affixed to the axle C and the member A respectively, tends to rotate the axle C and therefore also the pulleys D located on this axle. If the contact roller is in its right position on the trolley wire, this rotation cannot take place, the box J being then locked in the cap L by the locking device K. Said locking device consists of two bolts located in cases and adapted to be moved into locking position through the action of springs tending to force said bolts from their cases. When the motor is running in order, the bolts engage with corresponding openings in the box J thus locking said box within the cap L.

If, on the other hand, the contact roller slips from the trolley wire and darts upward, the block G will strike against the bolts of the locking device K and force them back against the action of the spring thereby releasing the box J. Now the spring B will act and rotate the pulleys D, and the ropes F will wind up the pulleys pulling down the box J. In order to ensure the downward movement of the box two corresponding longitudinal slots are arranged in the tube H through which slots extend the handles of the box. By means of the box, the block G and therewith the contact roller are carried downward.

When the hand, or hands, in charge has, or have, applied the roller to the trolley wire, the box will be lifted and thereby locked in the cap L by means of the locking device, whereupon the combination will be again ready for use.

In order to avoid too violent dashes on the member A when the box J is darting down, a compensator operating under spring control is arranged at E, against which the box J strikes when moving downward.

It will be understood that the combination may be constructed with various modifications. Especially the spring B may be replaced by an air piston operating in a cylinder.

What I claim is:—

1. In a trolley retriever, a tubular barrel, a casing at one end of the barrel, a shaft rotatably mounted in said casing, a spring connected with the shaft and casing and normally tensioned and tending to rotate the shaft in one direction, a drum upon the shaft rotatable therewith, a flexible element connected to and wound upon the drum, a plunger movable longitudinally of the barrel, the flexible element being connected to the said plunger to effect such movement of the plunger when the shaft is rotated by the spring and the flexible element is wound upon the drum, a pull element for connection at one end to the usual pull rope of the trolley and extended at its other end into the barrel, a head upon the last mentioned end of the pull element and normally suspended thereby within the barrel, the plunger having a part engageable by the head upon a pull being exerted upon the pull element by the pull rope of the trolley when the trolley wheel leaves the trolley wire, and means normally restraining the said plunger from movement and rendered inactive by the engagement of the head with a part thereof to release the plunger and permit movement thereof in the barrel through rotation of the shaft and drum and the winding of the flexible element on said drum to thereby tension the pull element and lower the trolley.

2. In a trolley retriever, a tubular barrel, a casing at one end of the barrel, a shaft rotatably mounted in said casing, a spring connected with the shaft and casing and normally tensioned and tending to rotate the shaft in one direction, a drum upon the shaft rotatable therewith, a flexible element connected to and wound upon the drum, a plunger movable longitudinally of the barrel, the flexible element being connected to the said plunger to effect such movement of the plunger when the shaft is rotated by the spring and the flexible element is wound upon the drum, a pull element for connection at one end to the usual pull rope of the trolley and extended at its other end into the barrel, a head upon the last mentioned end of the pull element and normally suspended thereby within the barrel, the plunger having a part engageable by the head upon a pull being exerted upon the pull element by the pull rope of the trolley when the trolley wheel leaves the trolley wire, means normally restraining the said plunger from movement and rendered inactive by the engagement of the head with a part thereof to release the plunger and permit movement thereof in the barrel through rotation of the shaft and drum and the winding of the flexible element on said drum to thereby tension the pull element and lower the trolley, and a resilient buffer within the barrel to cushion the movement of the plunger.

In testimony whereof I have signed my name to this specification.

KARL STEJSKAL.